(12) United States Patent
Kashiwagi (10) Patent No.: US 9,181,861 B2
(45) Date of Patent: Nov. 10, 2015

(54) INTERNAL COMBUSTION ENGINE CONTROL APPARATUS

(75) Inventor: Hideaki Kashiwagi, Ebina (JP)

(73) Assignee: Nissan Motor Co., Ltd., Yokohama (JP)

( * ) Notice: Subject to any disclaimer, the term of this patent is extended or adjusted under 35 U.S.C. 154(b) by 824 days.

(21) Appl. No.: 13/404,424

(22) Filed: Feb. 24, 2012

(65) Prior Publication Data

US 2012/0271529 A1   Oct. 25, 2012

(30) Foreign Application Priority Data

Apr. 25, 2011   (JP) .................................. 2011-096684

(51) Int. Cl.
| | | |
|---|---|---|
| *F02D 23/00* | (2006.01) | |
| *F02B 33/44* | (2006.01) | |
| *F02B 39/16* | (2006.01) | |
| *F02B 37/12* | (2006.01) | |

(52) U.S. Cl.
CPC ................. *F02B 39/16* (2013.01); *F02B 37/12* (2013.01); *F02B 2039/168* (2013.01); *Y02T 10/144* (2013.01)

(58) Field of Classification Search
CPC ..... F02B 37/12; F02B 39/16; F02B 2039/168
USPC .................. 60/602, 605.1; 701/102
See application file for complete search history.

(56) References Cited

U.S. PATENT DOCUMENTS

| | | | | |
|---|---|---|---|---|
| 6,401,457 | B1 * | 6/2002 | Wang et al. | ...................... 60/602 |
| 6,698,203 | B2 * | 3/2004 | Wang | .............................. 60/602 |
| 6,990,814 | B2 * | 1/2006 | Boley et al. | ...................... 60/602 |
| 7,107,978 | B2 * | 9/2006 | Itoyama | ................... 123/568.11 |
| 7,127,892 | B2 | 10/2006 | Akins et al. | |
| 7,610,757 | B2 | 11/2009 | Onodera | |

(Continued)

FOREIGN PATENT DOCUMENTS

| | | |
|---|---|---|
| CN | 101048583 A | 10/2007 |
| CN | 101048584 A | 10/2007 |

(Continued)

OTHER PUBLICATIONS

The extended European Search Report for corresponding European Application No. 12158614.3-2311, dated Apr. 27, 2012.

(Continued)

*Primary Examiner* — Thai Ba Trieu
*Assistant Examiner* — Ngoc T Nguyen
(74) *Attorney, Agent, or Firm* — Global IP Counselors, LLP (57) ABSTRACT

An internal combustion engine control apparatus includes a turbocharger, an intake air quantity detecting section, an intake air pressure detecting section, a turbine rotational speed limit determining section and a turbine control section. The turbine rotational speed limit determining section determines a turbine rotational speed limit pressure ratio between the upstream-side intake air pressure and a downstream-side intake air pressure in the air intake passage at a downstream side of the compressor for a turbine rotational speed limit that corresponds to the intake air quantity detected by the intake air quantity detecting section. The turbine rotational speed limit determining section further calculates a turbine over rotation suppressing boost pressure of the turbine compressor using the upstream-side intake air pressure and the turbine rotational speed limit pressure ratio. The turbine control section controls the turbocharger based on the turbine over rotation suppressing boost pressure.

9 Claims, 7 Drawing Sheets

(56) References Cited

U.S. PATENT DOCUMENTS

| | | | |
|---|---|---|---|
| 7,712,299 B2* | 5/2010 | Wolflick et al. | 60/794 |
| 2007/0227139 A1* | 10/2007 | Withrow et al. | 60/605.1 |
| 2011/0016876 A1* | 1/2011 | Cataldi et al. | 415/150 |

FOREIGN PATENT DOCUMENTS

| | | |
|---|---|---|
| CN | 101387236 A | 3/2009 |
| EP | 1741895 | 1/2007 |
| JP | 2003-161158 A | 6/2003 |
| JP | 2006-274863 A | 10/2006 |
| JP | 2008-223613 | 9/2008 |
| JP | 2009-180162 A | 8/2009 |

OTHER PUBLICATIONS

An English translation of the Chinese Office Action for the corresponding Chinese patent application No. 201210088911.5 issued on Jan. 27, 2014.

An English translation of the Japanese Office Action for the corresponding Japanese Application No. 2011-096684, issued on Dec. 16, 2014.

* cited by examiner

INTERNAL COMBUSTION ENGINE CONTROL APPARATUS

CROSS-REFERENCE TO RELATED APPLICATIONS

This application claims priority to Japanese Patent Application No. 2011-096684, filed on Apr. 25, 2011. The entire disclosure of Japanese Patent Application No. 2011-096684 is hereby incorporated herein by reference.

BACKGROUND

1. Field of the Invention

The present invention generally relates to an internal combustion engine control apparatus for controlling charge pressure of a turbocharger of an internal combustion engine equipped.

2. Background Information

Some internal combustion engines are provided with a turbocharger to improve performance. One example of an engine that is provided with a turbocharger is disclosed in Japanese Laid-Open Patent Publication No. 2008-223613. In this publication, a technology is disclosed for controlling a wastegate valve and an air bypass valve of the engine. The wastegate valve controls an intake flow rate of an exhaust gas bypass passage that bypasses a turbine of a turbocharger. The air bypass valve controls an intake flow rate of an intake air bypass passage that bypasses a compressor of the turbocharger. With the technology of this publication, when a collapse of an air intake passage is detected based on an intake air pulsation detected with an air flow meter, the wastegate valve and the air bypass valve are controlled so as to suppress excessive rotation of the compressor of the turbocharger caused by a decline of the intake air quantity resulting from the collapse of the air intake passage.

SUMMARY

In the above mentioned publication, upon determining a blockage exists in the air intake passage based on a fluctuation of the air flow rate, a control is executed to suppress an excessive rotational speed of the compressor. This control deals with the surge region where the rotational speed of the compressor increases due to a decrease upstream-side intake air pressure.

In view of the above, attempts have been made to use a small-sized turbocharger in order to improve torque of an engine at low engine speeds. In general, when the size of a turbocharger is reduced, a high degree of boosting (supercharging) can be achieved at low engine speeds. However, it has been determined that at high engine speeds, it becomes necessary to operate the turbocharger at or near a choke region in which the compressor efficiency drops drastically and where the turbine rotational speed is very sensitive to an intake air quantity is used. In particular, if the choke region is followed during transient period, then even though the boost pressure itself will not overshoot in comparison with a steady state, the intake air quantity will be greater than the intake air quantity during a steady state at the same engine rotational speed. This has been confirmed experimentally. It is believed that the reason for the increase of the intake air quantity is that the pressure at the inlet of the compressor decreases excessively toward a larger vacuum pressure as compared to the steady state. Consequently, it is possible for the turbine to undergo over rotation (i.e., rotates at an excessive rotational speed) during the transient period.

An internal combustion engine control apparatus according to the present disclosure was conceived in view of the problem explained above. One object is to provide an internal combustion engine control apparatus that suppresses over rotation of a turbocharger in a region near and including a choke region.

In view of the state of the known technology, one aspect of the present disclosure is to provide an internal combustion engine control apparatus that comprises a turbocharger, an intake air quantity detecting section, an intake air pressure detecting section, a turbine rotational speed limit determining section and a turbine control section. The turbocharger includes a compressor. The intake air quantity detecting section determines an intake air quantity of an air intake passage at an upstream side of the compressor. The intake air pressure detecting section determines of an upstream-side intake air pressure in the air intake passage at an upstream side of the compressor. The turbine rotational speed limit determining section determines a turbine rotational speed limit pressure ratio between the upstream-side intake air pressure and a downstream-side intake air pressure in the air intake passage at a downstream side of the compressor for a turbine rotational speed limit that corresponds to the intake air quantity detected by the intake air quantity detecting section. The turbine rotational speed limit determining section further calculates a turbine over rotation suppressing boost pressure of the turbine compressor using the upstream-side intake air pressure and the turbine rotational speed limit pressure ratio. The turbine control section controls the turbocharger based on the turbine over rotation suppressing boost pressure.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
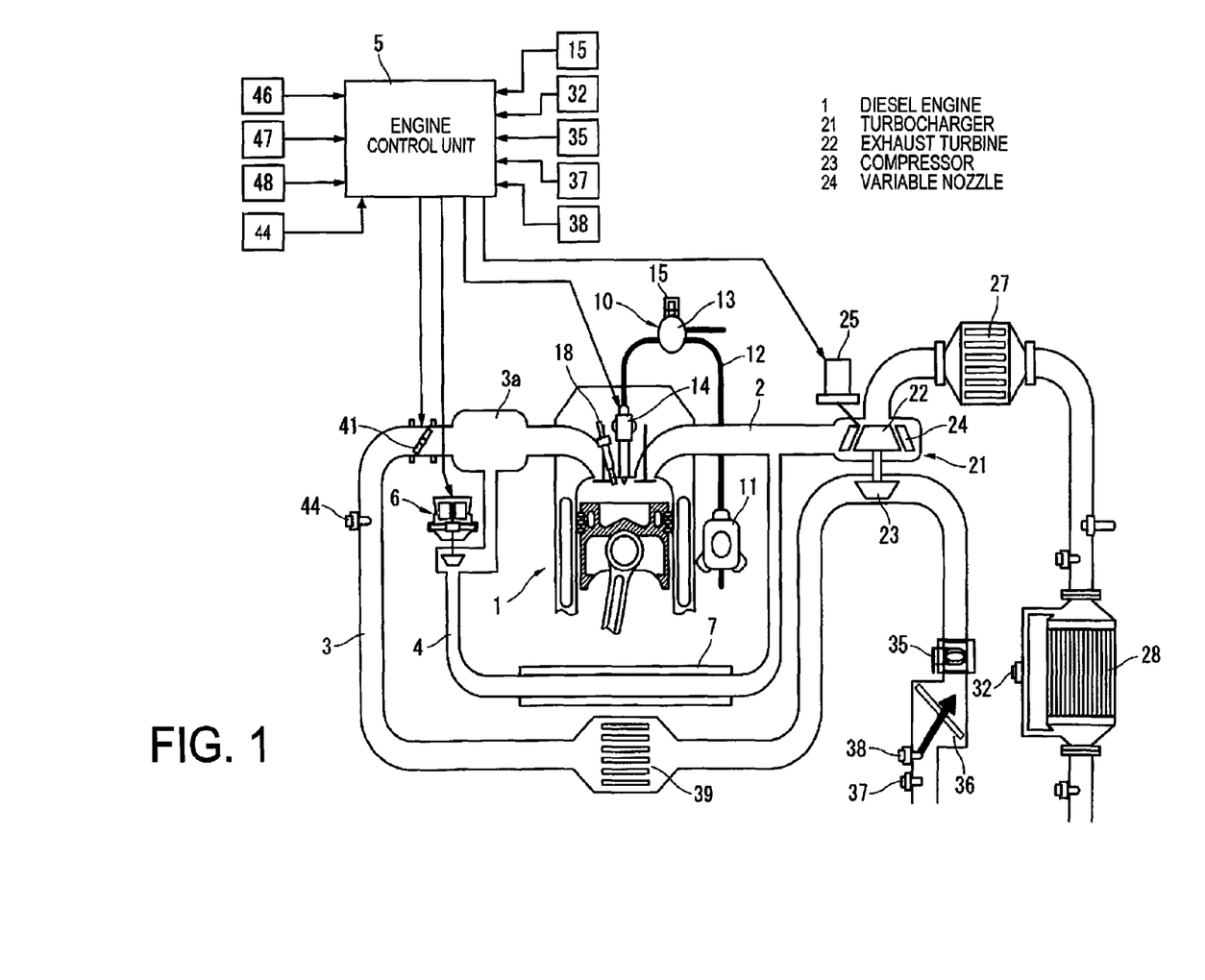
FIG. 1 is a schematic view of an entire diesel engine employing an internal combustion engine control apparatus according to one illustrative embodiment.

Referring initially to FIG. 1, an entire diesel engine 1 is schematically illustrated in accordance with a first embodiment. The diesel engine 1 has an exhaust passage 2 for exhausting air from the combustion chambers and an air intake passage 3 for introducing intake air into the combustion chambers. Since the diesel engine 1 is an internal combustion engine that is configured to execute exhaust gas recirculation (EGR), an EGR passage 4 is provided between the exhaust passage 2 and a collector section 3a of the air intake passage 3. The engine 1 also includes an engine control unit 5 that includes a microcomputer with engine control programs that controls the operation of the engine 1 as discussed below. The engine control unit 5 can also include other conventional components such as an input interface circuit, an output interface circuit, and storage devices such as a ROM (Read Only Memory) device and a RAM (Random Access Memory) device.

An EGR control valve 6 and an EGR cooler 7 are installed in the EGR passage 4. The opening degree of the EGR control valve 6 is controlled by the engine control unit so as to achieve a prescribed EGR rate in accordance with an engine operating condition. For example, the EGR control valve 6 is controlled such that the EGR rate is maximum in a low engine speed/low load region and decreases as the engine speed and engine load increase.

The diesel engine 1 is equipped with a common rail type fuel injection system 10 that is controlled by the engine control unit 5. In the common rail fuel injection system 10, a supply pump 11 supplies pressurized fuel that is passed through a high-pressure fuel supply passage 12. The pressurized fuel is stored temporarily in a pressure accumulator (common rail) 13. Afterwards, the fuel is distributed from the accumulator 13 to a plurality of fuel injection nozzles 14 of the respective cylinders. The fuel is injected in accordance with opening and closing of the fuel injection nozzles 14. A fuel pressure inside the pressure storage chamber 13 is variably adjusted by a pressure regulator (not shown). A fuel pressure sensor 15 is provided for detecting the fuel pressure is provided in the accumulator 13. A well-known glow plug 18 is arranged in the combustion chamber of each of the cylinders.

This diesel engine 1 also has a turbocharger 21 in which a turbine 22 and a compressor 23 are arranged coaxially. The turbine 22 is controlled by the engine control unit 5. The turbine 22 is positioned in the exhaust passage 2 downstream of a point from which the EGR passage 4 branches. The turbine 22 has a variable capacity structure featuring a variable nozzle 24 that is provided at a scroll inlet as a capacity varying device for regulating charge pressure. The variable nozzle 24 is driven by a diaphragm actuator 25 that operates in response to a control pressure (control negative pressure). Thus, when the opening degree of the variable nozzle 24 is small, a small capacity characteristic is obtained which is suited to conditions in which the exhaust flow rate is small, such as in a low engine speed operating region. Conversely, when the opening degree of the variable nozzle 24 is large, a large capacity characteristic is obtained which is suited to conditions in which the exhaust flow rate is large, such as in a high engine speed operating region. However, the turbocharger 21 is not limited to a variable capacity turbocharger having a turbine with a variably controlled nozzle opening degree. The turbocharger 21 can be provided with other types of charge pressure regulating devices. For example, instead of using a variable nozzle type turbocharger, the control apparatus of the present disclosure can be applied to a conventional turbocharger equipped with a variably controlled waste gate valve as a charge pressure regulating device.

A catalytic converter 27 and a particulate capturing filter 28 (diesel particulate filter: DPF) are arranged sequentially in the exhaust passage 2 downstream of the turbine 22. The catalytic converter 27 oxidizes CO and HC contained in the exhaust gas flowing in the exhaust passage 2 from the turbine 22. The DPF 28 captures and removes exhaust particulates (particulate matter: PM) in the exhaust gas flowing in the exhaust passage 2 from the turbine 22. Since a pressure drop across the DPF 28 changes as exhaust particulate matter accumulates in the DPF 28, a differential pressure sensor 32 is provided to detect a pressure difference between an inlet side and an outlet side of the DPF 28. It is also feasible to provide a pressure sensor at the inlet side and a pressure sensor at the outlet side to determine the pressure difference instead of using a differential pressure sensor 32 to detect the pressure difference directly.

The compressor 23 is arranged in the air intake passage 3. An air flow meter 35 is arranged upstream of the compressor 23. The air flow meter 35 detects an intake air quantity. An air cleaner 36 is arranged upstream of the air flow meter 35. An atmospheric pressure sensor 37 and an ambient air temperature sensor 38 are arranged on an inlet side of the air cleaner 36. The atmospheric pressure sensor 37 detects an external pressure, i.e., an atmospheric pressure. The ambient air temperature sensor 38 detects an outside air temperature are arranged on an inlet side of the air cleaner 36. An intercooler 39 for cooling the high-temperature pressure-boosted intake air is arranged between the compressor 23 and the collector section 3a.

A throttle valve 41 is provided on an inlet side of the collector section 3a of the air intake passage 3 for controlling (limiting) the air intake quantity. The throttle valve 41 is driven so as to open and close by a control signal from the engine control unit 5. A boost pressure sensor 44 is provided between the throttle valve 41 and the intercooler 39 and serves to detect a boost or downstream-side intake air pressure P2 (P_out-Comp) inside the air intake passage 3 at a point downstream of the compressor 23.

The engine control unit 5 controls an injection quantity and an injection timing of the fuel injection system 10, an opening degree of the EGR control valve 6, and an opening degree of the variable nozzle 24. In addition to previously mentioned sensors, the engine control unit 5 receives detection signals from an accelerator opening degree sensor 46 that detects an accelerator pedal depression amount, a rotational engine speed sensor 47 that detects an engine rotational speed, a coolant temperature sensor 48 that detects a coolant temperature, and other sensors.

When the size of the turbocharger 21 is small, a high degree of boosting (supercharging) can be achieved at low engine speeds. However, it has been determined that at high engine speeds, it becomes necessary to operate the turbocharger at or near a choke region in which the compressor efficiency drops drastically and where the turbine rotational speed is very sensitive to an intake air quantity is used. In particular, if the choke region is followed during transient period, then even though the boost pressure itself will not overshoot in comparison with a steady state, the intake air quantity will be greater than the intake air quantity during a steady state at the same engine rotational speed. This has been confirmed experimentally. It is believed that the reason for the increase of the intake air quantity is that the pressure at the inlet of the compressor decreases excessively toward a larger vacuum pressure as compared to the steady state. Consequently, it is possible for the turbine to undergo over rotation (i.e., rotates at an excessive rotational speed) during the transient period.

The turbocharger 21 of the diesel engine 1 is a small turbocharger such that during a transient period the intake air pressure on the upstream side of the compressor 23 decreases (toward atmospheric pressure) as the intake air quantity increases. However, in such a situation, the diesel engine 1 recognizes an operating state of the turbocharger 21 and controls the turbocharger 21 accordingly such that over rotation of the turbine 22 is suppressed during the transient period.

As explained below, a turbine over rotation suppressing boost pressure P_out_Comp_limit is defined as an intake air pressure downstream of the compressor 23 of the turbocharger 21 that would result in a turbine of the turbocharger rotating at a turbine rotational speed limit. An upstream-side intake air pressure P_in_Comp is defined as an intake air pressure on an upstream side of the compressor 23. A value of the turbine over rotation suppressing boost pressure P_out_Comp_limit is computed based on a turbine rotational speed limit pressure ratio Pratio_Comp_limit using the upstream-side intake air pressure P_in_comp. A target boost pressure TargetBoost of the internal combustion engine is calculated based on the computed turbine over rotation suppressing boost pressure P_out_Comp_limit.

Figure 2:
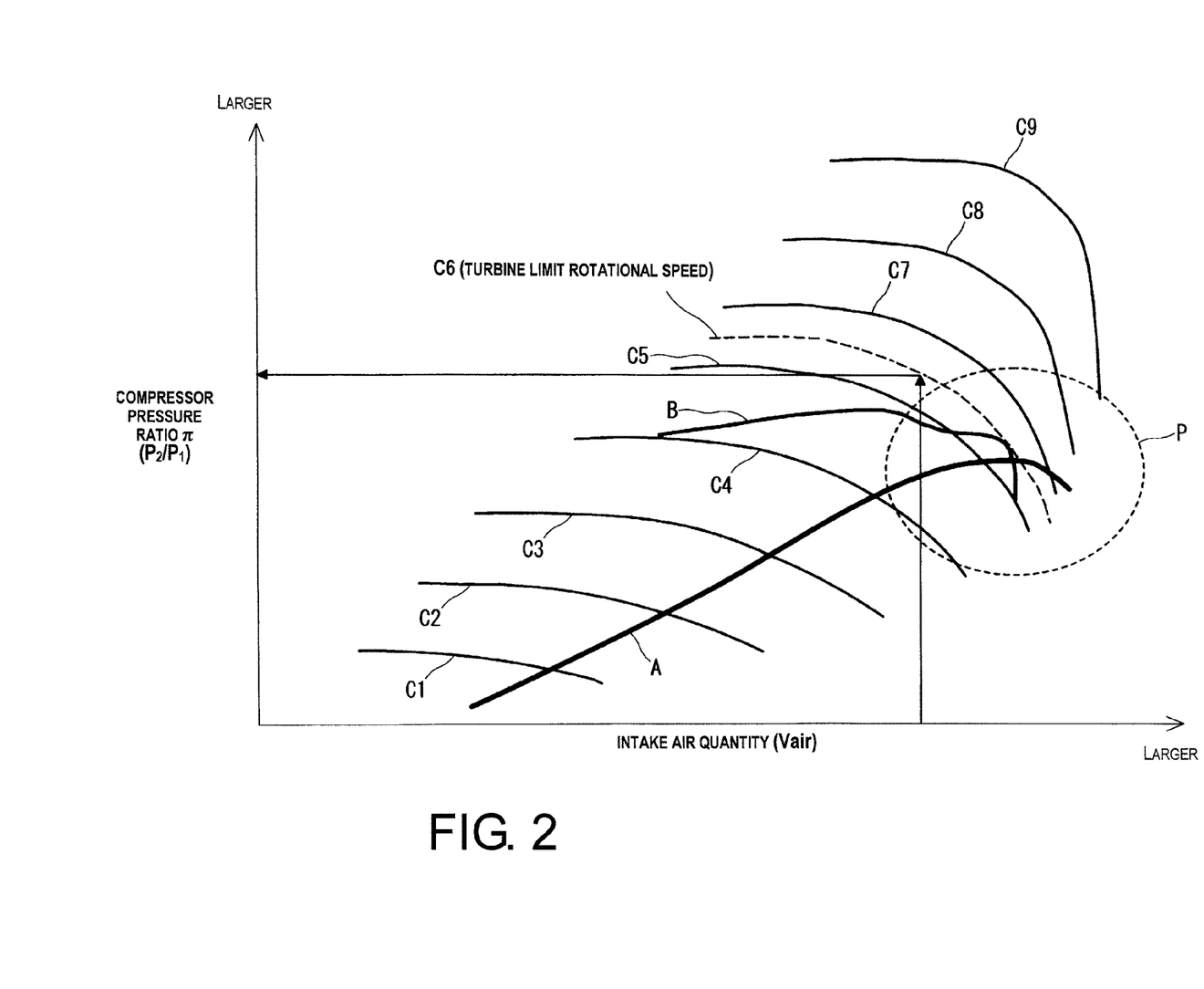
FIG. 2 is a compressor pressure ratio map or plot comparing a steady state and a transient state of a turbocharger of the engine illustrated in FIG. 1.

FIG. 2 is a compressor pressure ratio plot or map comparing a steady state and a transient state of a turbocharger 21. This compressor pressure ratio map is prestored for a particular turbocharger. The vertical axis indicates a compressor pressure ratio $\pi$, which is a ratio of the downstream-side intake air pressure P2 (P_out_Comp) inside the air intake passage 3 with respect to an upstream-side intake air pressure P1 (P_in_Comp) inside the air intake passage 3. The horizontal axis indicates an intake air quantity (volumetric flow rate) Vair on the upstream side of the compressor 23.

In the compressor pressure ratio map of FIG. 2, the characteristic curves C1 to C9 each indicate a correlation between the compressor pressure ratio $\pi$ and the intake air quantity at a particular constant circumferential speed (rotational speed) of the turbine 22. The circumferential speeds of the characteristic curves satisfy the following relationship: circumferential speed of C1>circumferential speed of C2> . . . >circumferential speed of C8>circumferential speed of C9. The characteristic curve C6 shown with a broken line corresponds to a maximum allowable rotational speed of the turbine 22. The characteristic curve B, shown in FIG. 2, plots the flow rate and the pressure ratio of the compressor when throttle is fully open (steady state) at each engine speed. Needless to say, in this map, various conditions for the curve B are adapted such that the turbine rotational speed does not exceed the maximum allowable rotational speed. Meanwhile, the characteristic curve A, shown in FIG. 2, indicates the state of the turbocharger 21 when engine state is changed from a constant speed to a fully open throttle (transient state) while in second gear. During the steady state, the turbocharger 21 is controlled such that the turbocharger 21 does not exceed the maximum allowable rotational speed, but the turbine rotational speed increases with a heightened sensitivity with respect to the intake air quantity as the engine rotational speed increases. Consequently, the turbine rotational speed exceeds the maximum allowable rotational speed and the turbine reaches a state of over rotation.

During the transient period the intake air quantity increases in comparison with the steady state period, and in an operating region of high engine rotational speed and high engine load, the intake air pressure decreases toward atmospheric pressure on an upstream side of the compressor 23. Thus, as indicated by the characteristic curve A in FIG. 2, the compressor pressure ratio $\pi$ increases in comparison with the steady state that is indicated by the characteristic curve B in FIG. 2. Consequently, even though the boost pressure does not overshoot, the rotational speed of the turbine 22 increases due to the increased compressor pressure ratio.

Therefore, a compressor pressure ratio $\pi$ (Pratio_Comp_limit) is calculated that would result in the turbine rotational speed limit being reached. This compressor pressure ratio $\pi$ (Pratio_Comp_limit) is calculated based on the upstream-side intake air pressure P1 (P_in_Comp) inside the air intake passage 3 that is calculated based on a current intake air quantity, and the downstream-side intake air pressure P2 (P_out_Comp) inside the air intake passage 3 that would result in the turbine rotational speed limit being reached is calculated based on the calculated pressure P1 (P_in_Comp) and the calculated compressor pressure ratio $\pi$ (Pratio_Comp_limit). A target boost pressure TargetBoost is then set to a value smaller than the downstream-side intake air pressure P2 (P_out_Comp) that was calculated.

More specifically, an intake air quantity Intake_Air that is detected by the air flow meter 35, an atmospheric pressure that is detected by the atmospheric pressure sensor 37, and an intake air temperature T_in_Comp that is detected by the ambient air temperature sensor 38 are used to calculate the upstream-side intake air pressure P1 (P_in_Comp) inside the air intake passage 3 on the upstream side of the compressor 23, an intake air quantity (volumetric flow rate) Vair, and an intake air quantity (mass flow rate) Gair. Then, a prestored map like that shown in FIG. 2 is used, as indicated by the arrows in FIG. 2, to find a compressor pressure ratio $\pi$ (Pratio_Comp_limit) that would result in the turbine rotational speed limit being reached when the intake air quantity Intake_Air that was detected equals the intake air quantity (volumetric flow rate) Vair that was calculated.

Next, a turbine over rotation suppressing boost pressure P2limit (P_out_Comp_limit) is calculated. The turbine over rotation suppressing boost pressure P2limit (P_out_Comp_limit) is a pressure occurring inside the air intake passage 3 on a downstream side of the compressor 23 when the turbine is rotating at the turbine rotational speed limit. The turbine over rotation suppressing boost pressure P2limit (P_out_Comp_limit) is calculated based on the compressor pressure ratio $\pi$ (Pratio_Comp_limit) and the upstream-side intake air pressure P1 (P_in_Comp) corresponding to the turbine rotational speed limit. The calculated turbine over rotation suppressing boost pressure P2limit (P_out_Comp_limit) is compared to a base target boost pressure Pbtb (Base_Target_Boost) that is calculated based on an engine rotational speed Ne and a fuel injection quantity Qbase using a prestored map. The smaller of the two values is used as a gauge pressure that is set as a target boost pressure TargetBoost.

Figure 3:
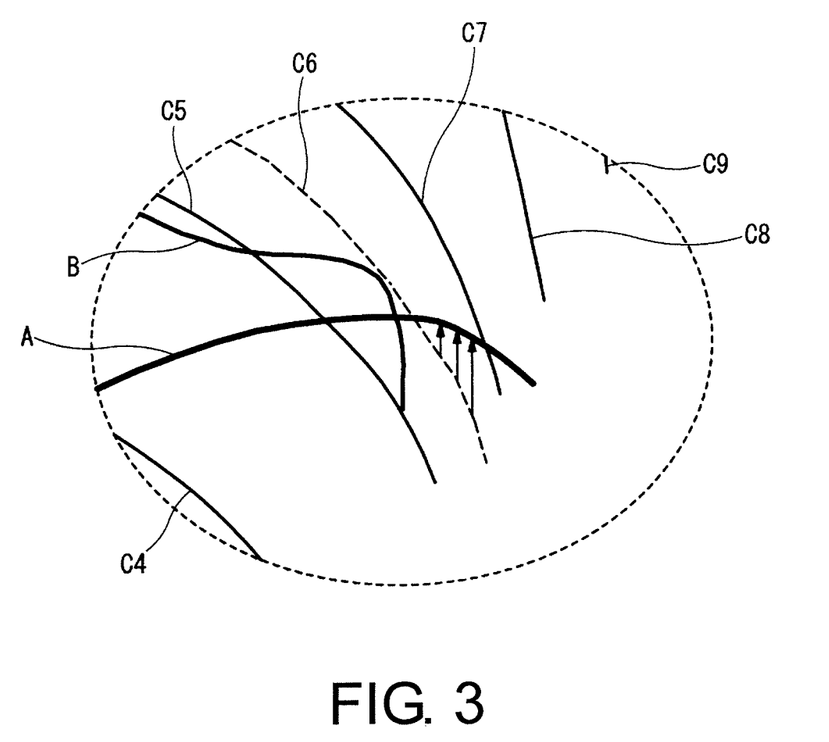
FIG. 3 is an enlarged view of the region P enclosed with a broken line in FIG. 2.

FIG. 3 is an enlarged view of the region P enclosed with a broken line in FIG. 2. The region P is a region in which the rotational speed of the turbine 22 becomes larger than the turbine rotational speed limit. In such a region, the turbine over rotation suppressing boost pressure P2limit (P_out_Comp_limit) is set as the target boost pressure TargetBoost.

An actual compressor pressure ratio $\pi$ (Actual_Pratio_Comp) is determined based on the downstream-side intake air pressure P2 (P_out_Comp) on a downstream side of the compressor 23 as indicated by a detection value from the boost pressure sensor 44 and the upstream-side intake air pressure P1 (P_in_Comp), which is a current downstream-side intake air pressure inside the air intake passage 3 on the upstream side of the compressor 23. As an amount by which the actual compressor pressure ratio $\pi$ (Actual_Pratio_Comp) exceeds the compressor pressure ratio $\pi$ (Pratio_Comp_limit) corresponding to the turbine rotational speed limit becomes larger, a feed-forward amount VN_opening_ratio that is used to execute feed-forward control of the opening degree of the variable nozzle 24 is corrected to greater value such that the variable nozzle 24 is controlled in an opening direction (i.e., increases the opening degree of the variable nozzle to a larger opening degree). More specifically, the feed-forward amount VN_Opening_ratio used for feed-forward control is corrected such that as an amount by which a compressor pressure ratio π of the characteristic curve A exceeds a compressor pressure ratio π of the characteristic curve C6 as indicated by arrows in FIG. 3 becomes larger, the opening degree of the variable nozzle will be increased to reduce charge pressure.

Figure 4:
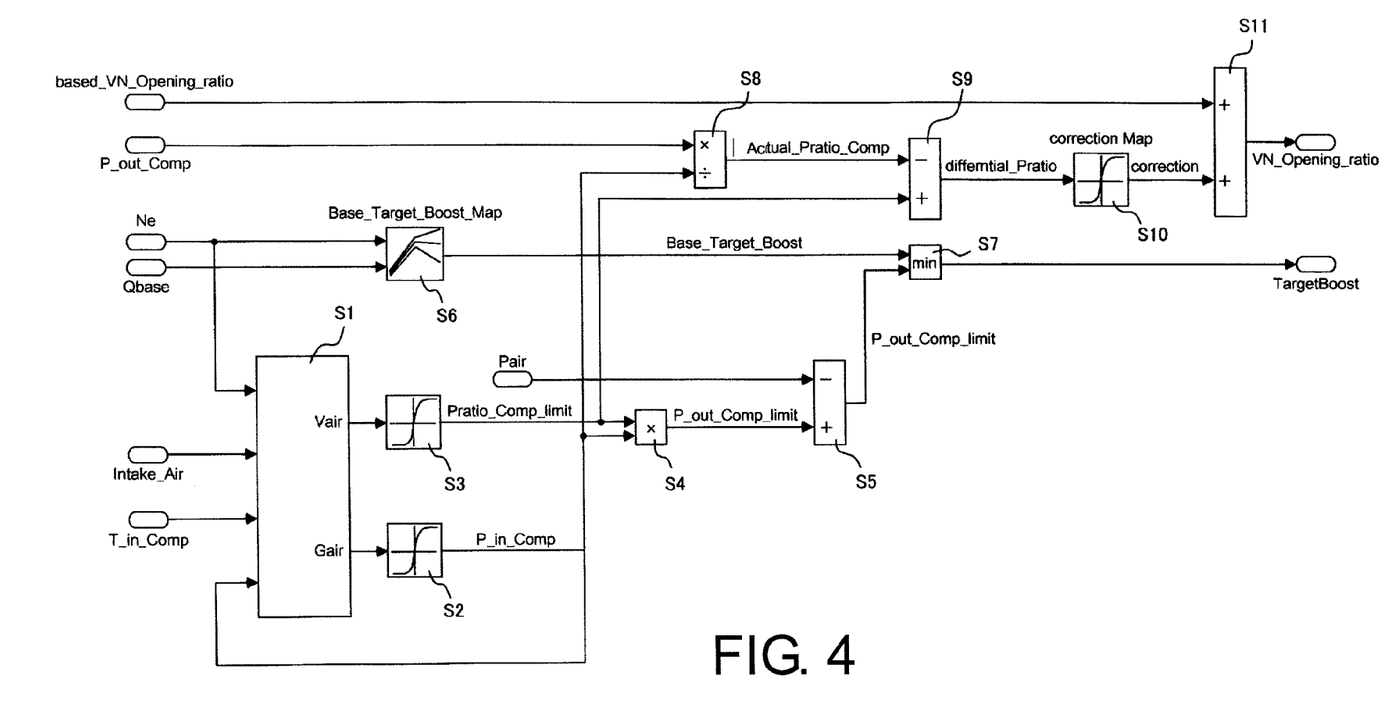
FIG. 4 is a block diagram showing a process for finding a target boost pressure TargetBoost and a feed-forward amount VN_Opening_ratio.

FIG. 4 is a block diagram illustrating a portion of the control executed by the engine control unit 5 process for determining the target boost pressure TargetBoost and for determining the feed-forward amount VN-Opening_ratio used to control the opening degree of the variable nozzle 24. Many of the functions shown in FIG. 4 are accomplished with software executed by the engine control unit 5.

In step S1, the engine control unit 5 calculates the intake air quantity (volumetric flow rate) Vair and the intake air quantity (mass flow rate) Gair of air flowing into the compressor 23 using the intake air quantity Intake_Air detected by the air flow meter 35, the intake air temperature T_in_Comp detected by the ambient air temperature sensor 38, the engine rotational speed Ne detected by the rotational speed sensor 47, and the upstream-side intake air pressure P1 (P_in_Comp) that is calculated in step S2 explained later. The intake air quantity (mass flow rate) Gair is calculated using the engine rotational speed Ne and the intake air quantity Intake_Air detected by the air flow meter 35. The intake air quantity (volumetric flow rate) Vair is calculated using the intake air temperature T_in_Comp detected by the ambient air temperature sensor 38, the upstream-side intake air pressure P1 (P_in_Comp) is calculated in step S2 (explained later), the intake air quantity Intake_Air detected by the air flow meter 35, and the engine rotational speed Ne detected by the rotational speed sensor 47. Step S1 constitutes an intake air quantity detecting section that determines an intake air quantity Intake_Air inside of the air intake passage 3 at the upstream side of the compressor 23 using the air flow meter 35.

Figure 5:
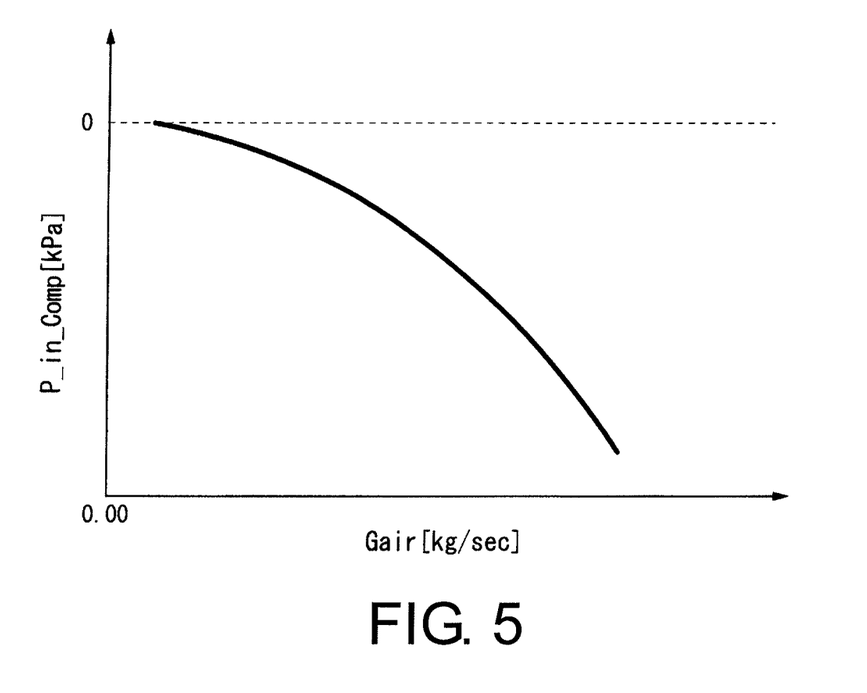
FIG. 5 is a compressor upstream pressure calculation map for calculating a pressure inside an air intake passage upstream of a compressor based on an intake air quantity.

In step S2, the engine control unit 5 uses a compressor upstream pressure calculation map like that shown in FIG. 5 to calculate the upstream-side intake air pressure P1 (P_in_Comp) that corresponds to the intake air quantity (mass flow rate) Gair. Step S2 constitutes a pressure detecting section that determines of an upstream-side intake air pressure inside of the air intake passage 3 at the upstream side of the compressor 23. Alternatively the upstream-side intake air pressure P1 (P_in_Comp) can be directly detected using sensors instead of estimating by using the compressor upstream pressure calculation map of FIG. 5. Of course, using an additional sensor instead of estimating the upstream-side intake air pressure P1 (P_in_Comp) may increase the cost of the control apparatus.

In step S3, the engine control unit 5 uses a compressor pressure ratio map like that shown in FIG. 2 to calculate a compressor pressure ratio π (Pratio_Comp_limit) that would result in the turbine rotational speed limit at the intake air quantity (volumetric flow rate) Vair.

In step S4, the engine control unit 5 calculates a turbine over rotation suppressing boost pressure P2limit (P_out_Comp_limit) corresponding to the upstream-side intake air pressure P1 (P_in_Comp), which was calculated in step S2, by multiplying the upstream-side intake air pressure P1 (P_in_Comp) by the compressor pressure ratio π (Pratio_Comp_limit) calculated in step S3.

In step S5, the engine control unit 5 converts the turbine over rotation suppressing boost pressure P2limit (P_out_Comp_limit) calculated in step S4 to a gauge pressure by subtracting an atmospheric pressure detected by the atmospheric pressure sensor 37 from the turbine over rotation suppressing boost pressure P2limit (P_out_Comp_limit).

In step S6, the engine control unit 5 uses a prescribed base target boost map to calculate a base target boost pressure Pbtb (Base_Target_Boost) based on an engine rotational speed Ne detected by the rotational speed sensor 47 and a fuel injection quantity Qbase.

In step S7, the engine control unit 5 compares the turbine over rotation suppressing boost pressure P2limit (P_out_Comp_limit), which was calculated in step S5, and the base target boost pressure Pbtb (Base_Target_Boost), which was calculated in step S6, and sets the smaller of the two values as the target boost pressure TargetBoost. Step S7 constitutes a part of a turbine rotational speed limit determining section for determining the target boost pressure TargetBoost.

In step S8, the engine control unit 5 calculates an actual compressor pressure ratio π (Actual_Pratio_Comp) based on the downstream-side intake air pressure P2 (P_out_Comp), which was detected by the boost pressure sensor 44, and the upstream-side intake air pressure P1 (P_in_Comp) calculated in step S2. Step S8 constitutes a compressor downstream pressure determining section that determines a detected current downstream-side intake air pressure inside of the air intake passage 3 at the downstream side of the compressor 23 using the boost pressure sensor 44 to physical detect the downstream-side intake air pressure inside of the air intake passage 3.

In step S9, the engine control unit 5 calculates a difference amount dfferential_Pratio by subtracting the compressor pressure ratio π (Pratio_Comp_limit) that would result in the turbine rotational speed limit at the intake air quantity (volumetric flow rate) Vair calculated in step S3 from the actual compressor pressure ratio π (Actual_Pratio_Comp) calculated in step S8.

In step S10, the engine control unit 5 uses the difference amount dfferential_Pratio calculated in step S9 and a prescribed correction map (correction_Map) to calculate a correction amount "Correction" for correcting a feed-forward amount VN_Opening_ratio used to execute feed-forward control of the opening degree of the variable nozzle 24.

In step S11, the engine control unit 5 calculates the feed-forward amount VN_Opening_ratio by adding the correction amount "Correction" calculated in step S10 to a base feed-forward amount based_VN-Opening_ratio set according to an exhaust gas energy.

Figure 6:
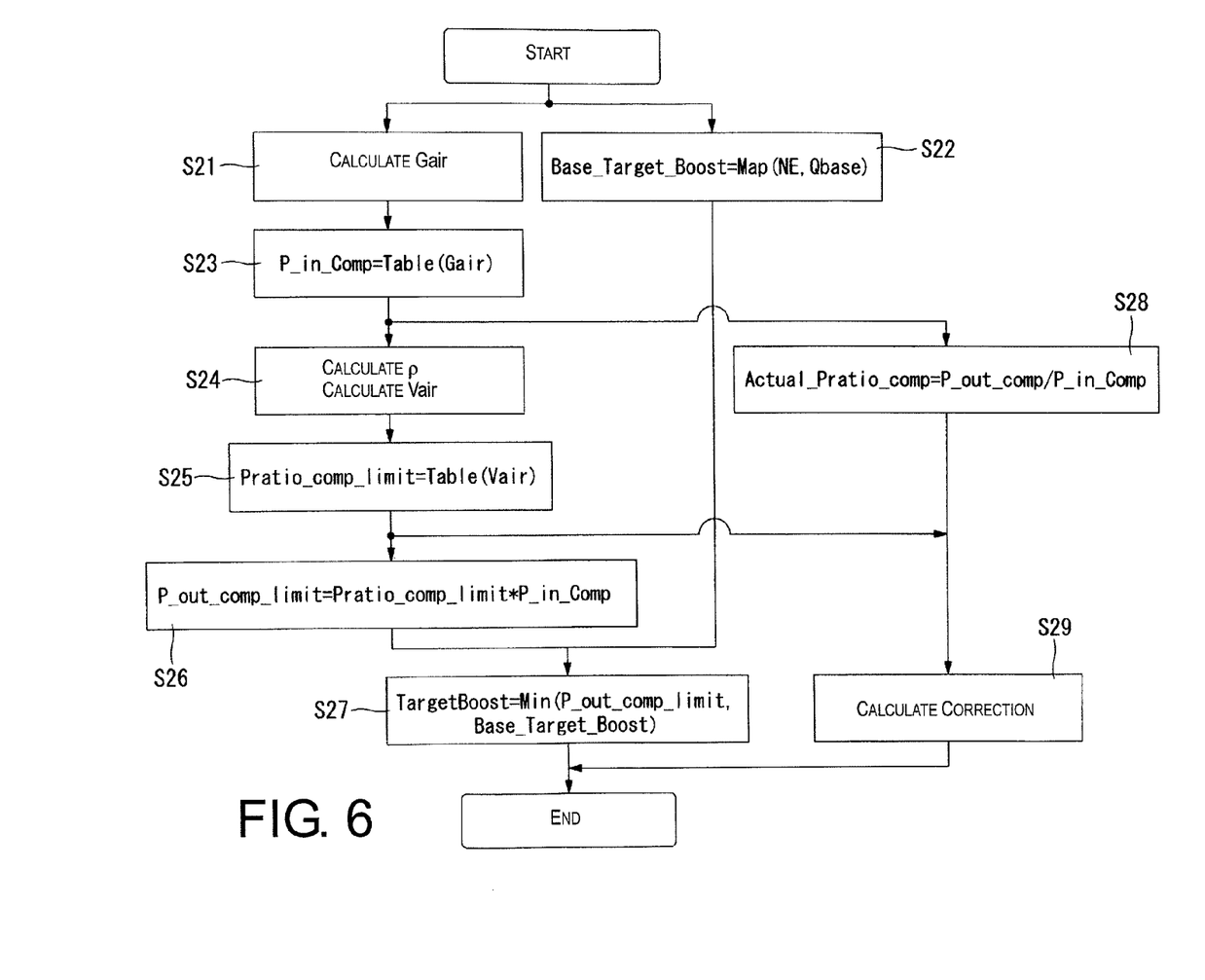
FIG. 6 is a flowchart showing a process executed by the control unit for finding a target boost pressure TargetBoost and a feed-forward amount VN_Opening_ratio.

FIG. 6 shows a flowchart of a portion of the control executed by the engine control unit 5 that constitutes a process for determining the target boost pressure TargetBoost and the feed-forward amount VN_Opening_ratio used to control the opening degree of the variable nozzle 24 via the diaphragm actuator 25. The flowchart of FIG. 6 constitutes a turbine control section of the engine control unit 5 that controls the turbocharger 21 towards the target boost pressure TargetBoost based on the turbine over rotation suppressing boost pressure P2limit (P_out_Comp_limit).

In step S21, the engine control unit 5 calculates an intake air quantity (mass flow rate) Gair using an engine rotational speed Ne and the intake air quantity Intake_Air detected by the air flow meter 35.

In step S22, the engine control unit 5 uses a prescribed map (Base_Target_Boost_Map) to calculate a base target boost pressure Pbtb (Base_Target_Boost) based on the engine rotational speed Ne detected by the rotational speed sensor 47 and the fuel injection quantity Qbase.

In step S23, the engine control unit 5 uses a compressor upstream pressure calculation map like that shown in FIG. 5 to calculate the upstream-side intake air pressure P1 (P_in_Comp) inside the air intake passage 3 that corresponds to the intake air quantity (mass flow rate) Gair.

In step S24, the engine control unit 5 calculates an intake air quantity (volumetric flow rate) Vair using the intake air temperature T_in_Comp detected by the ambient air temperature sensor 38, the upstream-side intake air pressure P1 (P_in_Comp) inside the air intake passage 3 calculated in step S23, the intake air quantity Intake_Air detected by the air flow meter 35, and the engine rotational speed Ne detected by the rotational speed sensor 47. The engine control unit 5 also calculates the air density using the intake air temperature T_in_Comp detected by the ambient air temperature sensor 38 and the upstream-side intake air pressure P1 (P_in_Comp) inside the air intake passage 3 upstream of the compressor 23 calculated in step S23.

In step S25, the engine control unit 5 uses a compressor pressure ratio map like that shown in FIG. 2 to calculate a compressor pressure ratio π (Pratio_Comp_limit) that would result in the turbine rotational speed equal to the turbine rotational speed limit at the intake air quantity (volumetric flow rate) Vair.

In step S26, the engine control unit 5 calculates a turbine over rotation suppressing boost pressure P2limit (P_out_Comp_limit) by multiplying the upstream-side intake air pressure P1 (P_in_Comp), which was calculated in step S23, by the compressor pressure ratio π (Pratio_Comp_limit), which was calculated in step S25.

In step S27, the engine control unit 5 compares the turbine over rotation suppressing boost pressure P2limit (P_out_Comp_limit), which was calculated in step S26, and the base target boost pressure Pbtb (Base_Target_Boost), which was calculated in step S22, and sets the smaller of the two values as a target boost pressure TargetBoost.

In step S28, the engine control unit 5 calculates the actual compressor pressure ratio π (Actual_Pratio_Comp) based on the downstream-side intake air pressure P2 (P_out_Comp), which was detected by the boost pressure sensor 44, and the upstream-side intake air pressure P1 (P_in_Comp) calculated in step S23.

In step S29, the engine control unit 5 calculates a difference amount dfferential_Pratio by subtracting the compressor pressure ratio π (Pratio_Comp_limit) resulting in the turbine rotational speed limit calculated in step S25 from the actual compressor pressure ratio π (Actual_Pratio_Comp) calculated in step S28. Then, the engine control unit 5 uses the difference amount dfferential_Pratio and a prescribed correction map (correction_Map) to calculate a correction amount "Correction" for correcting a feed-forward amount VN_Opening_ratio used to execute feed-forward control of the opening degree of the variable nozzle 24.

Figure 7:
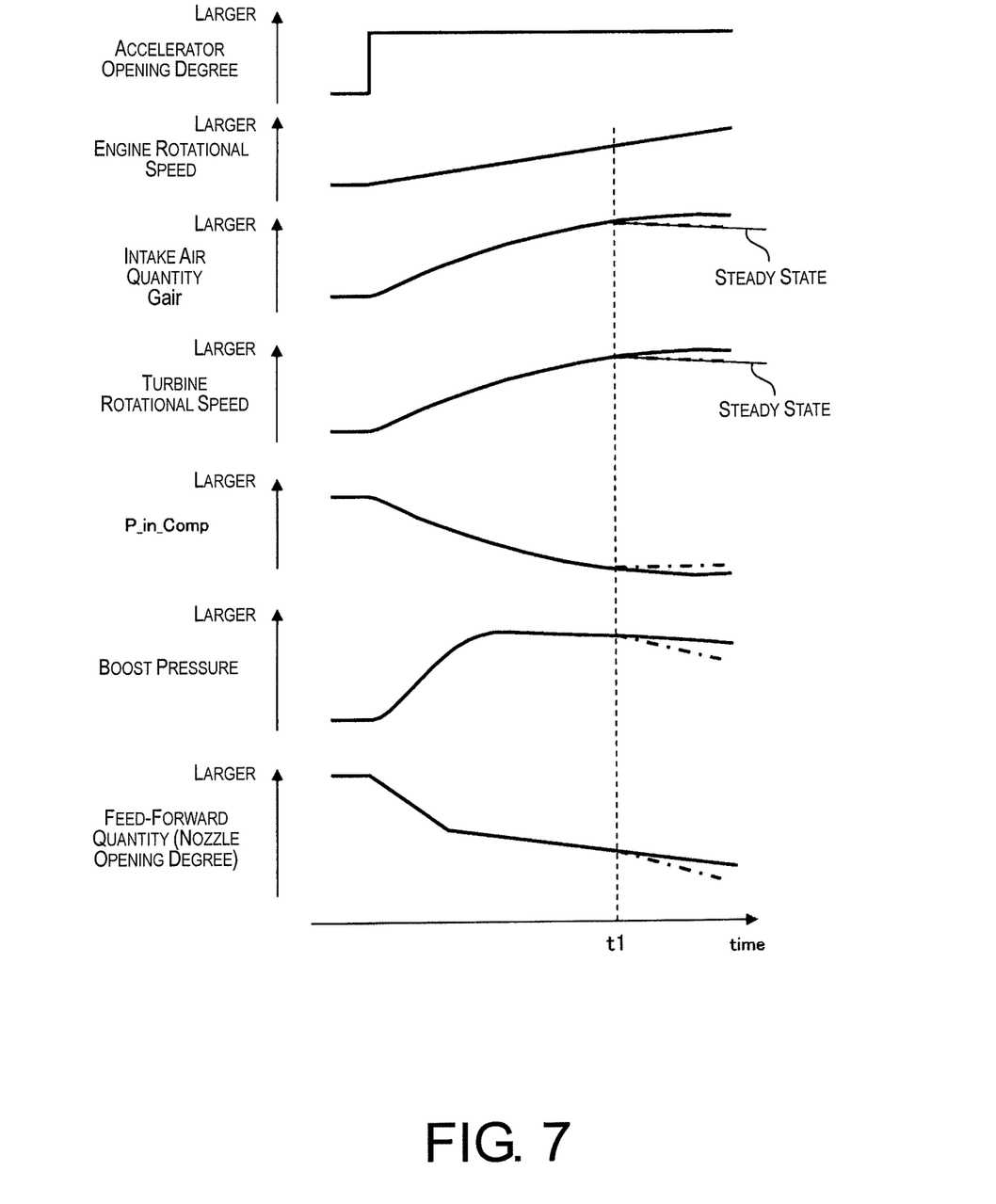
FIG. 7 is a timing chart showing how various parameters that change during a transient period.

As shown in the timing chart of FIG. 7, when the accelerator pedal is depressed, the engine rotational speed Ne and the intake air quantity (mass flow rate) Gair increase. At a time t1 when the rotational speed of the turbine 22 of the turbocharger 21 approaches the turbine rotational speed limit, the intake air quantity (mass flow rate) Gair (solid-line curve in FIG. 7) becomes larger than an intake air quantity (mass flow rate) Gair (fine-line curve in FIG. 7) corresponding to a steady state. Consequently, the intake air pressure P_in_Comp (solid-line curve in FIG. 7) upstream of the compressor 23 of the turbocharger 23 decreases (toward atmospheric pressure) and the pressure ratio of the intake air pressure downstream of the compressor 23 of the turbocharger 21 with respect to the intake air pressure upstream of the compressor 23 increases. As a result, the rotational speed (solid-line curve in FIG. 7) of the turbine 22 of the turbocharger 21 becomes higher than a rotational speed (fine-line curve in FIG. 7) corresponding to a steady state.

Therefore, in this embodiment, the turbine over rotation suppressing boost pressure P2limit (P_out_Comp_limit) is calculated using the intake air quantity (mass flow rate) Gair and, during a transient period, the target boost pressure TargetBoost is set to be smaller than the turbine over rotation suppressing boost pressure P2limit (P_out_Comp_limit). In this way, during a transient period, the intake air quantity (mass flow rate) Gair and the boost pressure can be lowered and the rotational speed of the turbine 22 of the turbocharger 21 can be suppressed as indicated with a single-dot chain line in FIG. 7. Also, during the transient period, since the intake air quantity (mass flow rate) Gair decreases as indicated by the single-dot chain line in FIG. 7, the intake air pressure P_in_Comp upstream of the compressor 23 of the turbocharger 21 increases as indicated by a single-dot chain line in FIG. 7.

Also, since the correction amount "Correction" for correcting the feed-forward amount VN_Opening_ratio used to executed feed-forward control of the opening degree of the variable nozzle 24 is calculated based on a difference dfferential_Pratio between an actual compressor pressure ratio π (Actual_Pratio_Comp) and a compressor pressure ratio π (Pratio_Comp_limit) at which the turbine rotational speed limit would be reached, the feed-forward amount VN_Opening_ratio can be corrected precisely during a transient period as indicated by the single-dot chain line in FIG. 7 and over rotation of the turbine 22 if the turbocharger 21 can be handled with good response during a transient period.

Regarding calculating the upstream-side intake air pressure P1 (P_in_Comp) inside the air intake passage 3 using the intake air quality (mass flow rate) Gair, it is acceptable to take into account how the pressure drop across a filter element of the air cleaner 36 changes with time. The farther the vehicle travels, the larger the amount of air that has passed through the filter element of the air cleaner 36 becomes. Consequently, as the vehicle travels farther, the amount of dust collected in the filter element increases and an air passage resistance of the filter element increases. To accommodate this variation of the air passage resistance, it is possible to prepare a plurality of compressor upstream pressure calculation maps like that shown in FIG. 5 in accordance with different distances traveled by the vehicle, more specifically, different distances traveled by the vehicle since the filter element of the air cleaner 36 started being used (i.e., since the filter element was last changed). By using the maps selectively in accordance with the distance the vehicle has traveled since the filter element of the air cleaner 36 started being used (i.e., since the filter element was last changed), the upstream-side intake air pressure P1 (P_in_Comp) inside the air intake passage 3 can be calculated precisely and over rotation of the turbine 22 of the turbocharger 21 can be suppressed more precisely during a transient period. The compressor upstream pressure calculating maps are prepared and stored in the engine control unit 5 to take into account the distance the vehicle has traveled since the filter element of the air cleaner 36 started being used (i.e., since the filter element was last changed) In particular, as the distance the vehicle has traveled increases since the filter element of the air cleaner 36 started being used, for the same intake air quantity (mass flow rate) Gair, the selected map sets the upstream-side intake air pressure P1 (P_in_Comp) inside the air intake passage 3 at the upstream side of the compressor 23 in the direction of the negative pressure.

In understanding the scope of the present invention, the terms "determine" and "determining" as used herein to describe an operation or function carried out by a component, a section, a device or the like includes a component, a section, a device or the like that does not require physical detection, but rather includes actual measuring, estimating, modeling, predicting or computing or the like to carry out the operation or function unless otherwise specified. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them unless otherwise specified. The functions of one element can be performed by two, and vice versa unless otherwise specified. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. An internal combustion engine control apparatus comprising:
   a turbocharger including a compressor; and
   a controller having executable instructions stored on a non-transitory computer readable medium that, when executed during operation of an internal combustion engine, perform operations to:
   determine an intake air quantity of an air intake passage upstream of the compressor,
   determine an upstream-side intake air pressure in the air intake passage upstream of the compressor,
   determine a downstream-side intake air pressure in the air intake passage downstream of the compressor,
   determine a turbine rotational speed limit based on a compressor pressure ratio at the determined intake air quantity,
   determine a turbine rotational speed limit pressure ratio based on the turbine rotational speed limit, the rotational speed limit pressure ratio being a ratio between the upstream-side intake air pressure and the downstream-side intake air pressure,
   calculate a turbine over rotation suppressing boost pressure of the compressor based on the upstream-side intake air pressure and the turbine rotational speed limit pressure ratio, and
   control the turbocharger based on the turbine over rotation suppressing boost pressure.

2. The internal combustion engine control apparatus according to claim 1, wherein the controller has further instructions that perform operations to:
   determine a base target boost pressure downstream of the compressor based on an engine rotational speed and a fuel injection quantity of the internal combustion engine, set a target boost pressure by selecting a smaller value of the turbine over rotation suppressing boost pressure and the base target boost pressure, and
   control the turbocharger based on the target boost pressure.

3. The internal combustion engine control apparatus according to claim 2, wherein the controller has further instructions that perform operations to:
   determine a current downstream-side intake air pressure; and
   perform a feed-forward control of a nozzle opening degree of a turbine of the turbocharger such that a boost pressure becomes equal to the target boost pressure using a feed-forward amount to correct the feed-forward control, the feed forward control being performed in accordance with a difference between a downstream-side-to-upstream-side intake air pressure ratio based on the current downstream-side intake air pressure, the turbine rotational speed limit pressure ratio, and the intake air quantity.

4. The internal combustion engine control apparatus according to claim 3, wherein controller has further instructions that perform operations to correct the feed-forward amount such that the nozzle opening degree of the turbine is controlled in an opening direction, the feed-forward amount reducing charge pressure being an amount by which the downstream-side-to-upstream-side intake air pressure ratio exceeds an increase to the turbine rotational speed limit pressure ratio.

5. The internal combustion engine control apparatus according to claim 1, wherein the controller has further instructions that perform operations to:
   determine a current downstream-side intake air pressure; and
   perform a feed-forward control of a nozzle opening degree of a turbine of the turbocharger such that a boost pressure becomes equal to a target boost pressure using a feed-forward amount to correct the feed-forward control, the feed-forward control being corrected in accordance with a difference between a downstream-side-to-upstream-side intake air pressure ratio using the current downstream-side intake air pressure and the turbine rotational speed limit pressure ratio and based on the intake air quantity.

6. The internal combustion engine control apparatus according to claim 5, wherein the controller has further instructions that perform operations to correct the feed-forward amount such that the nozzle opening degree of the turbine is controlled in an opening direction, the feed forward amount corrected by reducing charge pressure by an amount which the downstream-side-to-upstream-side intake air pressure ratio exceeds the turbine rotational speed limit pressure ratio increases.

7. The internal combustion engine control apparatus according to claim 1, wherein the controller has further instructions that perform operations to correct a value of the upstream-side intake air pressure according to a distance traveled by a vehicle in which the internal combustion engine is installed.

8. The internal combustion engine control apparatus according to claim 1, wherein the turbocharger is a variable capacity turbocharger that includes a turbine with a variably controlled nozzle opening degree.

9. The internal combustion engine control apparatus according to claim 1, wherein the controller has further instructions that perform operations to estimate the upstream-side intake air pressure in the air intake passage upstream of the compressor.

* * * * *